United States Patent
Blum

(10) Patent No.: US 8,291,267 B2
(45) Date of Patent: Oct. 16, 2012

(54) SYSTEM FOR DETERMINING REAL TIME NETWORK UP TIME

(75) Inventor: William R. Blum, Huntington Station, NY (US)

(73) Assignee: Honeywell International Inc., Morristown, NJ (US)

(*) Notice: Subject to any disclaimer, the term of this patent is extended or adjusted under 35 U.S.C. 154(b) by 665 days.

(21) Appl. No.: 12/107,479

(22) Filed: Apr. 22, 2008

(65) Prior Publication Data
US 2009/0265576 A1    Oct. 22, 2009

(51) Int. Cl.
    G06F 11/00    (2006.01)
(52) U.S. Cl. ........................................ 714/48
(58) Field of Classification Search .............. 714/48
    See application file for complete search history.

(56) References Cited

U.S. PATENT DOCUMENTS

| | | | |
|---|---|---|---|
| 6,813,634 B1* | 11/2004 | Ahmed | 709/224 |
| 7,130,899 B1* | 10/2006 | Bauer et al. | 709/223 |
| 7,865,764 B2* | 1/2011 | Jester | 714/47.1 |
| 8,190,568 B2* | 5/2012 | Caballero-McCann et al. | 707/617 |
| 2002/0075827 A1* | 6/2002 | Balogh et al. | 370/331 |
| 2003/0177396 A1* | 9/2003 | Bartlett et al. | 713/201 |
| 2003/0196148 A1 | 10/2003 | Harrisville-Wolff et al. | |
| 2004/0192375 A1* | 9/2004 | Cho et al. | 455/550.1 |
| 2005/0091383 A1* | 4/2005 | Bender et al. | 709/228 |
| 2005/0259641 A1* | 11/2005 | Beninato et al. | 370/354 |
| 2009/0005085 A1* | 1/2009 | Das | 455/460 |
| 2009/0013210 A1* | 1/2009 | McIntosh et al. | 714/4 |
| 2009/0177298 A1* | 7/2009 | McFarland et al. | 700/90 |

OTHER PUBLICATIONS http://en.wikipedia.org/wiki/Email.*
European Search Report mailed Jun. 16, 2009 corresponding to International application No. 0915766.0-1525.
SMS4MAIL: "SMS4Mail software information page: Ping_Alert 1.2" Internet Citation, [Online] Apr. 1, 2006, pp. 1-2, retrieved from http://www.sms4mail.com/detaile.htm on Jun. 4, 2009.
Anonymous: "Download page "TheOne Server Monitor Pro 2.5"" Internet Citation, [Online] Jun. 3, 2007, pp. 1-2, retrieved from http://download.cnet.com/ . . . on Jun. 4, 2009.
Reilly J et al., "Enabling mobile network manager" Computer Networks and ISDN Systems, North Holland Publishing. Amsterdam, NL, vol. 29, No. 8-13, Sep. 1, 1997, pp. 1417-1428.
Vougioukas S et al., "A system for basic-level network fault management based on the GSM short message service (SMS)" EUROCON'2001, Jul. 4-7, 2001, IEEE, vol. 1, 4, pp. 218-222.

* cited by examiner

*Primary Examiner* — Scott Baderman
*Assistant Examiner* — Yair Leibovich
(74) *Attorney, Agent, or Firm* — Husch Blackwell

(57) ABSTRACT

The inventive system and method for determining the availability of a computer network comprises a device operable to connect to at least the computer network using internet communications and using GSM, and an alarm service and/or a central server, wherein the device attempts to connect to the computer network using the internet communications and if the device fails to connect within a predetermined value, such as an amount of time or a number of tries, the device uses the GSM to notify the alarm service of the failure to connect. In one embodiment, after the device notifies the alarm service and/or central server of the failure to connect, the device continues to attempt to connect to the computer network, and if the device connects within another predetermined value, the device notifies the alarm service and/or central server of the restoral of service.

10 Claims, 2 Drawing Sheets

SYSTEM FOR DETERMINING REAL TIME NETWORK UP TIME

FIELD OF THE INVENTION

The present invention relates generally to network availability. In particular, the invention relates to determining the availability of a computer network.

BACKGROUND OF THE INVENTION

Monitoring server and network up time are critical in the marketplace. Down time can mean lost revenue and productivity given the dependency on these networks and servers. Many web site and internet service operators may be aware of gross outages, but may not have visibility into local connectivity issues including, but not limited to, internet service providers (ISP) outages, Intranet failures at large customer sites, regional outages, and loss of virtual private network (VPN) connectivity between intranet connected facilities. Hence, there is a need to be able to determine quality of service from a more localized perspective for critical network services. In particular, there is a need to determine whether network connectivity is available and to send an alert if it is not.

SUMMARY OF THE INVENTION

The present invention advantageously provides a system that delivers secure, reliable and complementary Internet and digital communications. The inventive solution combines Internet service with Global System for Mobility (GSM) for added reliability and an extra level of security, providing true redundancy and multi-path message delivery.

The inventive system and method for determining the availability of a computer network comprises a device operable to connect to a plurality of services using internet communications and using GSM, said plurality of services including at least the computer network, and an alarm service and/or a central server, wherein the device attempts to connect to the computer network using the internet communications and if the device fails to connect within a predetermined value, such as an amount of time or a number of tries, the device uses the GSM to notify the alarm service and/or the central server of the failure to connect. In one embodiment, after the device notifies the alarm service and/or central server of the failure to connect, the device continues to attempt to connect to the computer network, and if the device connects within another predetermined value, the device notifies the alarm service and/or central server of the restoral of service.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

The foregoing and other objects, aspects, features, advantages of the invention will become more apparent from the following description and from the claims.

DISCLOSURE OF THE INVENTION

Figure 1:
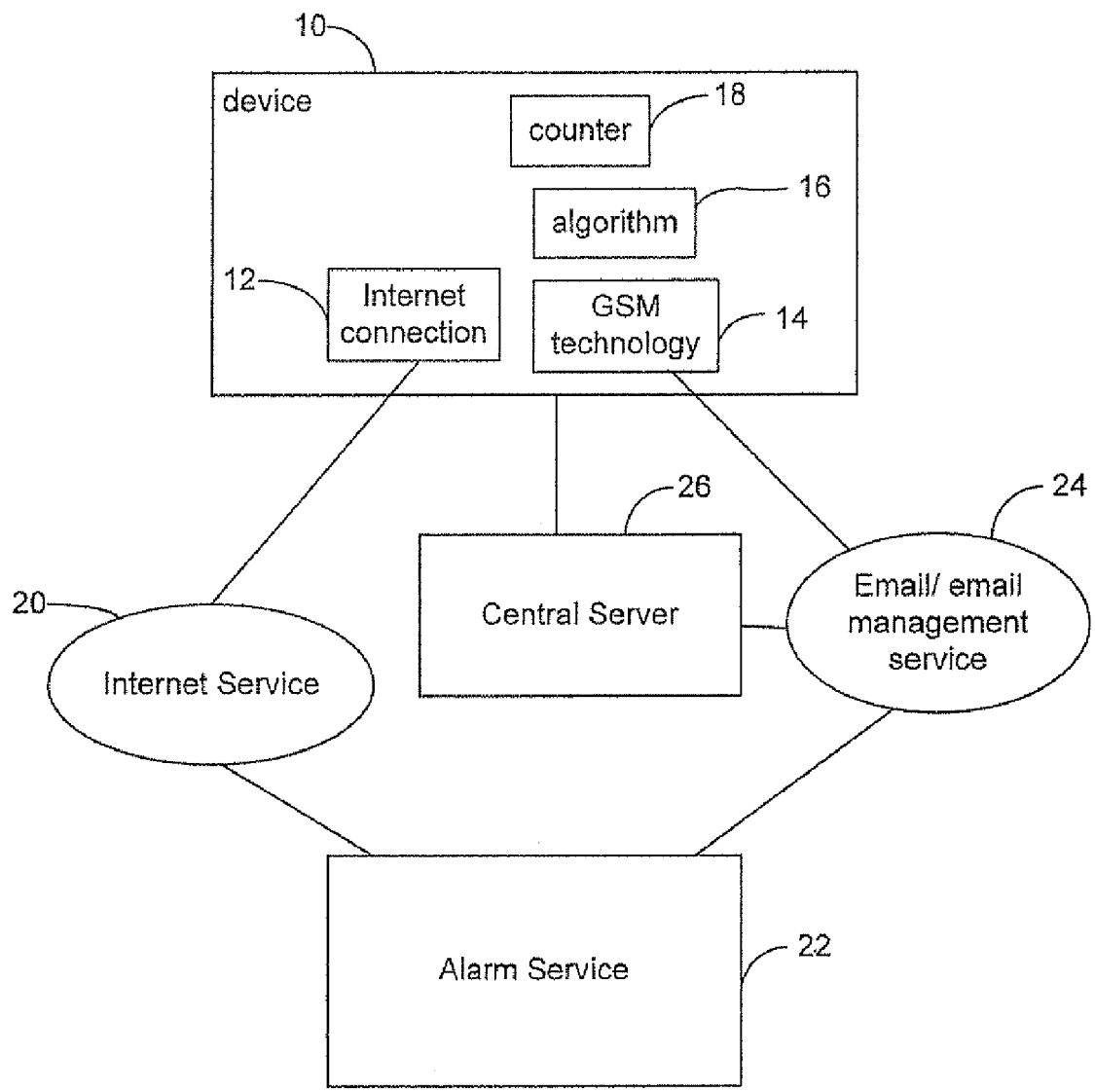
FIG. 1 is a schematic illustration of the present invention.

FIG. 1 is schematic illustration of the inventive system comprising a device 10 having internet communications or internet connection capability 12 and dual GSM technology 14. The internet communications 12 provide connection capabilities to the internet and/or various intranets, such as business systems used by corporations to conduct business. An Ethernet connection, connecting to the internet either directly or via a gateway, can be used as the internet communications 12. A wired Ethernet connection as the internet connection capability 12 enables monitoring of connectivity both on the internet and on one or more intranets. The dual GSM technology can include GPRS (General Packet Radio Service), and SMS (Short Message Service), and the GSM path can utilize GPRS and automatically switch to SMS if GPRS is unavailable. The device 10 also has a programmable "probing" algorithm 16 and a timer or counter 18.

The inventive system further comprises a computer network and/or an internet service 20 and an alarm service 22 as well as an email messaging service 24 capable of transmitting alarm messages as email messages or email from the device 10 to the alarm service 22. In the alternative, emails can be sent directly from the device 10 to the alarm service 22. Typically, emails are sent using GSM technology 14. The internet service 20 could include one or more internet service providers (ISPs). The alarm service 22 can be a manned location, such as an MIS help desk, a dispatching service, or classic alarm central station. Personnel at the alarm service 22 will act on notifications.

A central server 26 can also be provided to accumulate failure information, discussed below, and to perform the notification function, discussed below. In one embodiment, the central server 26 can be an un-manned dispatching or routing server that provides routing of alerts to an alarm service 22, or to managed email/paging/notification services. Further, the central server 26 can store performance data that can be retrieved through reporting and web tools.

The inventive device 10 can be placed in locations in which connectivity is critical, but sporadic. As illustrated above, the device 10 uses the wireless network or GSM technology 14 to report the failure to connect. This allows the device 10 to report if the local IP connection is unavailable, i.e., totally down, or if monitoring is required of an intranet resource (not shown) where there is no internet connectivity desired.

Figure 2:
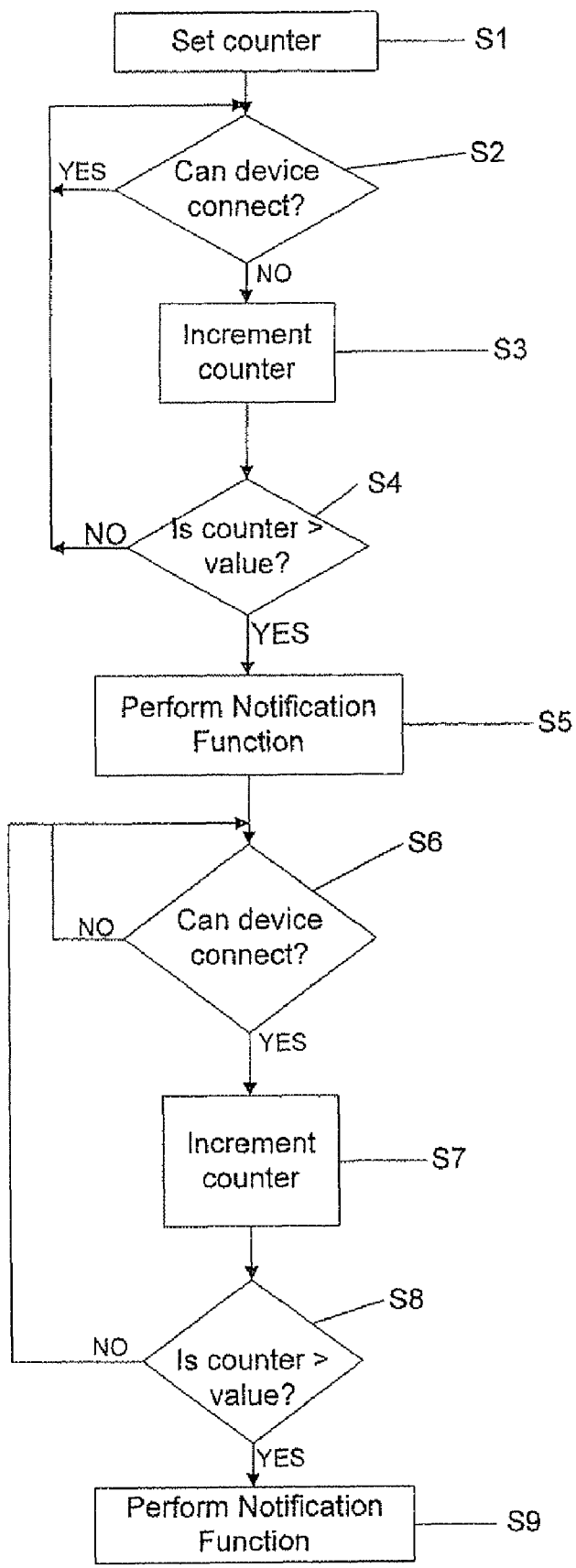
FIG. 2 is a flow diagram of the steps carried out by the present invention.

Operation of the inventive device 10 is now described with reference to FIG. 2 in accordance with the system shown in FIG. 1. Upon initialization, a counter 18 is set or initialized in step S1 and the device 10 attempts to connect to the internet service 20 or intranet resource. The attempts to connect continue periodically in step S2, that is, the probing algorithm 16 of device 10 tries to connect to the internet service 20 and, as long as the connection is successful (S2=YES), operation is ongoing. Accordingly, step S2 is repeated.

If the device 10 fails to connect (S2=NO), the counter 18 is incremented in step S3. The value of the counter 18 is checked in step S4. If the counter is greater than a predetermined value, such as a time out value or a maximum number of attempts value, (S4=YES), a predetermined number or time frame is exceeded, and the failure to connect is reported. In this situation, in step S5, the notification function is performed. In one embodiment, the notification function is performed by the device 10 which generates an alarm through an alarm service 22, or generates an email message that will be either forwarded directly through email or indirectly through a managed email messaging service 24. After performing the notification function, the central service 26 can be informed of the failure to connect, failure information, described below, can be collected and the counter 18 can be reset. In another embodiment, the central server 26 performs the notification function.

Otherwise, if the counter 18 is less than or equal to the predetermined value (S4=NO), control returns to step S2 and the device 10 again checks for a connection.

After performing notification of a failure, the device 10 attempts to determine whether service is restored. In step S6, the device 10 attempts to connect to the internet service 20. If the device 10 does not connect (S6=NO), it continues to periodically check the connection. Accordingly, step S6 is repeated.

If the device 10 successfully connects (S6=YES), the counter 18 is incremented in step S7. The value of the counter 18 is checked in step S8, and if the counter 18 is greater than a predetermined value (S8=YES), the notification procedure reporting the successful connection is performed at step S9. For example, a restoral of service notification is sent, and the counter 18 is reset. In addition, restoral information, described below, can be collected.

If, however, the counter 18 is less than or equal to the predetermined value (S8=NO), control returns to step S6 and the device 10 again checks for a connection.

A variety of options for notification exist. One option is that the device 10 could have a "mailing list" so that the programmed list of recipients is notified using SMS or email. In another option, the device 10 could work in conjunction with the central server 26 which could intelligently make decisions on notification based on data from multiple locations and user preferences.

Information related to connectivity can be maintained, such as in a log or database in the central server 26. This information can include both failure information and restoral information. For example, the failure and/or restoral information, such as location of the device 10, its predetermined time out value, time of day of connection failure and/or restoration, etc., can be stored. Merging of this data from various connection points will give a good quality of service measurement for the sites monitored at various locations. Connectivity statistics can be sent on a periodic basis to the central server 26 along with the notifications of failures and restorals. This central server 26 will combine information from various locations based on user preferences to generate reports based on various items, such as network architecture, location, ISP, service type, etc., stored in the central server 26. In one embodiment, users will be able to link locations, set performance metrics, and/or map devices that are related versus independent devices.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for determining the availability of a computer network, comprising:
   a device operable to connect to a plurality of services using internet communications and using GSM, said plurality of services including at least the computer network;
   a central sever; and
   an alarm service,
   wherein the device periodically attempts to connect to the computer network using the internet communications and if the device fails to connect, then the device continues to attempt to connect to the computer network using the internet communications until the device fails to connect within a predetermined value, and when the device fails to connect within the predetermined value, the device uses the GSM to notify at least one of the central server and the alarm service of the failure to connect,
   wherein the predetermined value includes a predetermined number of attempts the device makes to connect to the computer network using internet communications,
   wherein after the device notifies of the failure to connect, the device continues to attempt to connect to the computer network,
   wherein if the device is connected to the computer network for greater than a second predetermined value; then the device notifies at least one of the central server and the alarm service of a restoral of service, and
   wherein the second predetermined value includes a second predetermined number of attempts the device makes to connect to the computer network.

2. The system according to claim 1, wherein the computer network is one of an intranet and a virtual private network.

3. The system according to claim 1, further comprising an email management service, wherein the device notifies the alarm service by emailing the email management service and the email management service notifies the alarm service.

4. A system for determining the availability of a computer network, comprising:
   a device operable to connect to a plurality of services using interne communications and using GSM, said plurality of services including at least the computer network; and
   a central server,
   wherein the device periodically attempts to connect to the computer network using the internet communications and if the device fails to connect, then the device continues to attempt to connect to the computer network using the internet communications until the device fails to connect within a predetermined value, and when the device fails to connect within the predetermined value, the device uses the GSM to notify the central server of the failure to connect,
   wherein the predetermined value includes a predetermined number of attempts the device makes to connect to the computer network using internet communications,
   wherein after the device notifies of the failure to connect, the device continues to attempt to connect to the computer network,
   wherein if the device is connected to the computer network for greater than a second predetermined value, then the device notifies the central server of restoral of service, and
   wherein the second predetermined value includes a second predetermined number of attempts the device makes to connect to the computer network.

5. The system according to claim 4, wherein the computer network is one of an intranet and a virtual private network.

6. The system according to claim 4, further comprising an email management service, wherein the device notifies the central server by emailing the email management service and the email management service notifies the central server.

7. The system according to claim 4, wherein the central server performs a notification function.

8. The system according to claim 4, wherein the central server comprises a database having failure information and restoral information.

9. A method for determining the availability of a computer network, comprising:

attempting to connect to the computer network using internet communications;

if attempting to connect fails and a predetermined value is not reached, continuing to attempt to connect to the computer network using internet communications;

if attempting to connect fails and a predetermined value is reached, notifying an alarm service of the failure to connect;

after notifying of the failure to connect, continuing to attempt to connect to the computer network; and if connection is successful for greater than a second predetermined value, then notifying the alarm service of a restoral of service, wherein said step of notifying is performed using the GSM, wherein the predetermined value includes a predetermined number of attempts to connect to the computer network using internet communications, and wherein the second predetermined value includes a second predetermined number of attempts made to connect to the computer network.

10. The method according to claim 9, wherein said step of notifying the alarm service is performed by emailing an email management service and the email management service notifies the alarm service.

* * * * *